United States Patent [19]

Rackovan et al.

[11] Patent Number: 5,242,650
[45] Date of Patent: Sep. 7, 1993

[54] IN-MOLD LABELLING A COEXTRUDED, STRETCHED AND ANNEALED LABEL

[75] Inventors: Mitchell J. Rackovan, Mentor-on-the-Lake; Kushalkumar M. Baid; Gerald G. Popely, both of Mentor; Ronald V. Lloyd, Geneva, all of Ohio

[73] Assignee: Avery Dennison Corporation, Pasadena, Calif.

[21] Appl. No.: 756,556

[22] Filed: Sep. 9, 1991

[51] Int. Cl.[5] .............................................. B29C 43/22
[52] U.S. Cl. .................................. 264/509; 264/171; 264/210.5; 264/235.6; 156/244.11; 156/244.16; 156/244.24
[58] Field of Search ............ 264/509, 132, 171, 210.5, 264/235.6, 346, 151, 169, 241; 156/244.24, 244.16, 244.11

[56] References Cited

U.S. PATENT DOCUMENTS

| | | | |
|---|---|---|---|
| 4,393,115 | 7/1983 | Yoshii et al. | 428/323 |
| 4,501,797 | 2/1985 | Super et al. | 428/349 |
| 4,601,926 | 7/1986 | Jabarin et al. | 428/35 |
| 4,837,075 | 6/1989 | Dudley | 428/220 |
| 4,883,697 | 11/1989 | Dornbusch et al. | 428/35.7 |
| 4,886,698 | 12/1989 | Purdy | 428/213 |
| 4,892,779 | 1/1990 | Leatherman et al. | 428/206 |
| 4,904,324 | 2/1990 | Heider | 156/214 |
| 4,986,866 | 1/1991 | Ohba et al. | 156/220 |
| 5,026,592 | 6/1991 | Janocha et al. | 428/215 |
| 5,073,435 | 12/1991 | Eyraud et al. | 156/244.24 |
| 5,126,197 | 6/1992 | Schinkel et al. | 428/349 |

FOREIGN PATENT DOCUMENTS 2012357 3/1990 Canada .
2-217223 2/1989 Japan .
2201681A 3/1988 United Kingdom .

OTHER PUBLICATIONS

Opticite Label Films Publication by Dow Chemical.

*Primary Examiner*—Catherine Timm
*Attorney, Agent, or Firm*—Pearne, Gordon, McCoy & Granger

[57] ABSTRACT

A uniaxially oriented coextruded polymeric in-mold label film includes a uniaxially hot-stretched, annealed, linerless self-wound film having a face layer for printing and a base layer which includes a heat-activatable adhesive. The heat-shrinkability of the film is balanced thickness-wise to minimize curl and allow the film to be printed in conventional label-printing presses. An antistat is included only in the charge for the base layer which includes the heat-activatable adhesive. In the manufacture of labelled blow-molded containers, sheets and labels formed from the film may be handled at high speeds while maintaining accurate registration and dimensional and positional integrity even in the absence of any reinforcing backing, yet the labels perform well on deformable containers such as shampoo bottles.

30 Claims, 1 Drawing Sheet

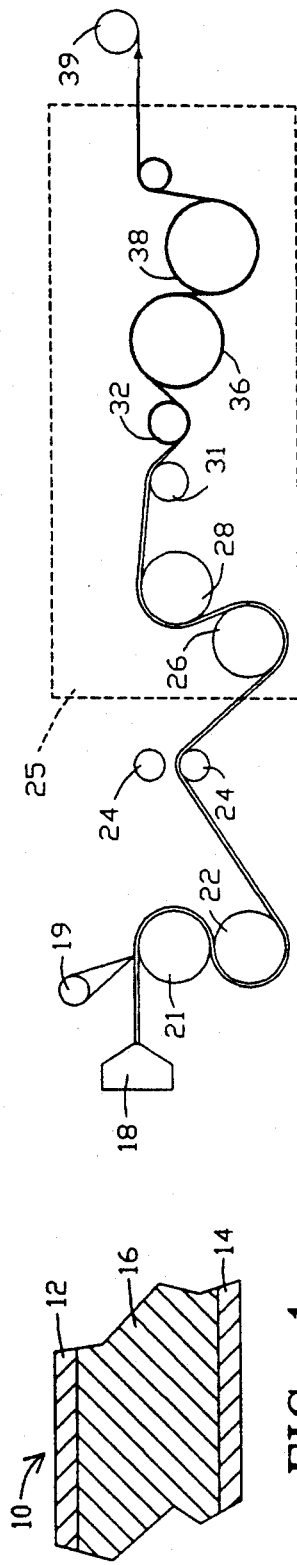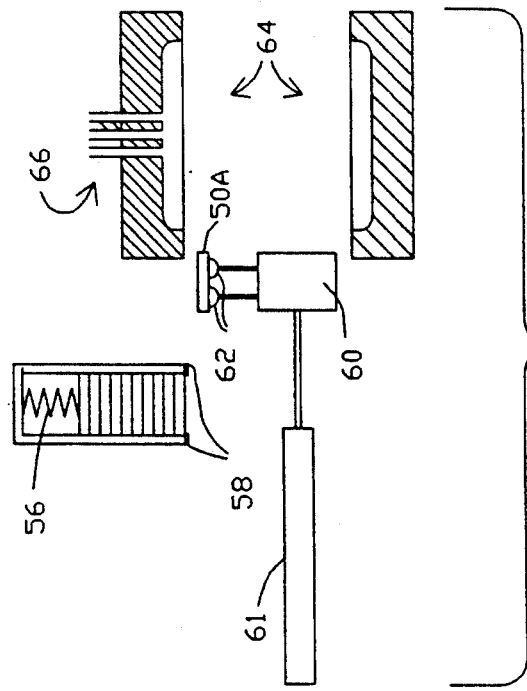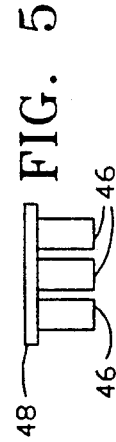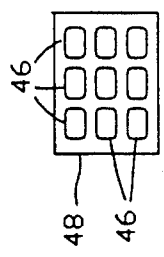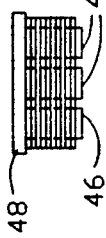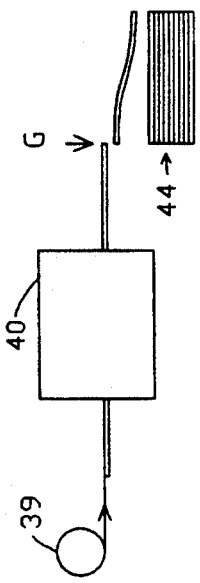

IN-MOLD LABELLING A COEXTRUDED, STRETCHED AND ANNEALED LABEL

This invention relates to in-mold labelling, using in-mold labels of the kind adapted to label blow-molded plastic containers. Labelling methods and articles of this kind are referred to as "in-mold" because the labels are held in place within the mold which forms the container during the container-forming step.

The invention particularly applies to in-mold labelling using polymeric labels, rather than using paper or paper-like labels. Polymeric labels offer many aesthetic and functional advantages over paper labels in the labelling of containers made by blow-molding plastic resins, such as high density polyethylene (HDPE). When a plastic container such as a HDPE squeeze bottle is used to package a product such as a hair shampoo, a package using a polymeric label is generally more appealing to consumers than a package using a paper label. In many applications the use of polymeric labels is required for reasons of appearance, handling, performance, moisture-resistance, conformability, durability and compatibility with the container to be labelled. Polymeric labels also enable clear or substantially transparent labels with only the label indicia being visible to the consumer.

In-mold labelling has significant advantages over methods commonly used in the past to label plastic containers with polymeric labels. The most common of these previous methods involve the use of liner-carried pressure-sensitive adhesive labels, or liner-carried heat-activatable adhesive labels. To produce the liner-carried labels, a laminating step is performed to sandwich a layer of adhesive between a web of label stock and a web of silicone-coated paper which is to function as a carrier or release liner, the label stock is printed, the ink is dried by heating elements or ultraviolet radiation (which also generates heat in the form of infrared), separate labels are cut from the label stock by passing the combination through a rotary-die or flat-bed cutting station, and the matrix of waste or trim label stock (and corresponding excess adhesive) surrounding the formed labels is stripped and discarded or recycled. What remains is a succession of individual labels releasably carried on the release liner.

In such earlier methods using carrier-supported polymeric labels, the paper or paper-like carrier or release liner may be relied on to provide dimensional stability to the relatively stretchy and deformable polymeric stock during printing of the labels and ink-drying under heat or ultraviolet, and during die-cutting of the labels and other manipulations which may subject the label stock or labels to mechanical and/or thermal stress on the high-speed printing or labelling lines. This use of the liner to provide dimensional stability avoids distortion of the label stock or labels and resulting interference with continuous high-quality production.

In such earlier methods, the labelling of the plastic containers is separate from the manufacture of the containers themselves. At the labelling station, the release liner on which the labels are releasably carried is drawn backwardly around a peel-back edge, thereby deploying the labels one after the other for application to the already-formed plastic containers. The cost of the release liner used in such earlier methods is a significant part of the total material cost associated with labelling, and may even approach the cost of the label stock itself. Therefore, the use of release liner involves a considerable economic cost. Furthermore the liner becomes scrap with little or no reclaim value as soon as it has been employed to dispense the labels. The need to dispose of unreclaimed scrap represents an ecological cost.

The matrix of waste or trim label stock involved in such prior methods also involves economic and ecological costs to the extent that the trim (which includes not only label stock but also adhesive) cannot be fully recycled. Even if the trim can be recycled to some extent, the costs of material handling and avoiding contamination incident to recycling also involve real economic and environmental costs.

In respect of paper labels, in-mold labelling has been widely practiced for some time. In respect of polymeric labels, in-mold labelling has been proposed as an alternative to the prior methods mentioned above in which release liner or carrier must be used. In-mold labelling using polymeric labels would avoid any use of release liner or carrier, and therefore would avoid the material and ecological costs associated with carrier and matrix disposal or attempted recycling. In in-mold labelling with polymeric labels, self-supported or free-film polymeric label stock (i.e., linerless polymeric stock) would be combined with heat-activatable adhesive, printed, die-cut and then arranged for deployment, as by being magazine-loaded as a series or stack of linerless labels, or by other means. The polymeric labels would then be sequentially deployed on the molding surface of a blow mold to be bonded onto successive hot workpieces as the workpieces (extruded parisons) are blown and expand against the molding surface and activate the heat-activatable adhesive.

Despite the advantages of in-mold labelling over liner-carried labelling, the commercially successful accomplishment of in-mold labelling with polymeric labels has been inhibited by several problems that are not encountered in in-mold labelling using paper labels. One is a lack of an acceptable degree of compatibility with conventional printing presses. The printing of label stock in conventional printing presses used in the label industry subjects the stock to considerable mechanical and thermal stresses incident to the training of the stock through the press and the drying of the ink. Paper stock relatively easily resists these stresses, whether or not the stock is combined with a liner. Also when liner-carried polymeric stock is printed, the dimensional stability of the paper carrier can be relied on to maintain the dimensional integrity of the polymeric stock which tends to stretch and deform under heat. However, there can be no such reliance when free-film polymeric label stock suitable for in-mold labelling is printed. But unless in-mold labelling products and methods are compatible with the use of such conventional printing presses, the threat of obsoleting existing presses presents a strong economic obstacle to wide acceptance of in-mold labelling in the packaging industry.

For in-mold labelling with paper labels, a method for die-cutting printed linerless paper label stock into labels and arranging the individual die-cut labels for deployment in the mold involves sheeting the printed label stock, stacking the sheets, forming stacks of individual labels from the stacked sheets with punch dies, and magazine-loading the stacks of individual labels, all done while maintaining proper positioning and registration. The inherent dimensional stability and stiffness of the paper aids in the accomplishment of this process. But labelling with polymeric stock using a similar sequence presents still another problem inhibiting the use of in-mold labelling with polymeric labels—that of meeting the requirements relating to physical manipulation of the work in process. One requirement is that the linerless printed sheeted polymeric stock be capable of being stacked layer-by-layer in registration so that the die-cutting is accurate. Another requirement is that the individual linerless labels dispense one-by-one in a reliable manner from the magazines and not flutter or deform as they are whipped into position in the mold by high-speed transfer means.

The linerless stock and individual labels must meet these requirements, but must also be flexible enough to continue to conform to molded containers to which they are adhered despite flexing or squeezing of those containers.

Another problem is that accumulation of static charges must be prevented, since their presence interferes with handling and will prevent accurate stacking and die cutting. The use of antistat agents is known, but their use must not interfere with printing, molding, and label adhesion. The topical application of antistat agents on the face of the label stock after it is printed but prior to sheeting is a possibility but is an expensive and cumbersome step.

One example of a recent proposal for in-mold labelling with polymeric labels is found in U.S. Pat. No. 4,837,075 to Dudley. In this patent, polymeric label stock in the form of a multilayer coextrudate (including a layer of heat-activatable adhesive as one of the coextruded layers) is provided which is intended to stand up to handling by high-speed automated equipment during the in-mold labelling procedure. However, Dudley does not address the problem of providing and processing free-film label stock through a conventional label printing press in such a way as to avoid distortion. While Dudley does recognize the importance of avoiding wrinkling or folding handling by high speed automated equipment, Dudley does not address how to accomplish the same in a manner compatible with the use of conventional printing presses. Nor does Dudley address the problem of eliminating static charges without adversely affecting printing.

THE PRESENT INVENTION

The present invention overcomes the problems discussed above. The invention contemplates a uniaxially-oriented coextruded polymeric in-mold label film, one of the coextruded layers including a heat-activatable adhesive. The invention involves the concepts, alone or in combination, of (1) hot-stretching and annealing or heat-setting the coextrudate prior to printing of the stock (and without activating the adhesive even though the temperature of activation of the adhesive is generally lower than the heating roll temperatures associated with hot-stretching and annealing), (2) thickness-wise balancing of the heat-shrinkability of the extruded layers so as to minimize curling, and (3) providing an antistat agent in the charge for the adhesive-containing layer. The invention will be more fully understood from the following more detailed description, taken together with the accompanying drawings, which are highly schematic or diagrammatic and in which FIG. 1 diagrammatically illustrates a coextruded in-mold label film contemplated by the invention; FIG. 2 is a sketch illustrating a coextruding, hot-stretching and annealing line used in the method of the invention; FIG. 3 is a diagrammatic representation of a printing, drying, sheeting and stacking line used in the method of the invention; FIGS. 4-7 diagrammatically illustrate the punch-cutting of in-mold labels into individual stacks of labels in one means of practicing the invention; and FIG. 8 diagrammatically illustrates the use of the stacked labels in a molding operation, The label film 10 shown in FIG. 1 is a coextrusion consisting of a top or face layer 12, adhesive-containing or base layer 14 which includes a heat-activatable adhesive, and a central or core layer 16. The charges for the several layers are prepared for extrusion through the multifeed coextrusion die 18 as illustrated in FIG. 2. In the particular example described, the total thickness of the film as it leaves the casting station is about 20 mils.

As is typical with the kinds of polymeric resins and adhesives useful in the practice of the invention, the physical properties of the in-mold label film material are enhanced by hot-stretching and annealing. Hot-stretching is performed at a temperature equal to or above the softening temperature of the film. Such temperature may exceed the activation or softening temperature of the adhesive. Annealing may similarly involve a processing temperature exceeding the adhesive activation temperature. The in-mold label film material should be annealed at a temperature sufficiently above the expected service temperature to avoid shrinking, relaxing or any distortion of the film which may interfere with the in-mold labelling process. The annealing temperature of the film material is therefore equal to or higher than the temperature at which the heat-activated adhesive is eventually to be activated by contact with the workpieces. In hot-stretching and annealing in the practice of the invention, the extrudate is trained through a series of relatively hot and cool rolls which contact the extrudate to thereby impart heat to and remove heat from the extrudate under time-temperature-direction conditions established by line speed, roll temperature, roll size, and side of contact. According to one important aspect of the invention, the time-temperature-direction conditions are controlled so as to heat at least a majority of the thickness of the extrudate to above its softening temperature prior to stretching without activating the adhesive to an extent that there is sticking of the adhesive to any of the series of heated and cooled rolls that contact the adhesive, and such conditions are also controlled so as to heat at least a majority of the thickness of the extrudate to its annealing temperature following stretching again without activating the adhesive to an extent that there is sticking of the adhesive to any of the series of rolls. This can be successfully accomplished despite the annealing temperature and possibly the softening temperature being equal to or higher than the temperature at which the hot workpieces contact the adhesive to activate it.

In accordance with these concepts, in a particular example of the method of the invention, the extrusion die is maintained at 400 degrees F. The extruded film is cast "adhesive side up" (i.e. with layer 14 on the top side and layer 12 on the bottom) onto a casting roll 21 which is maintained at 100 degrees F. and is provided with an air knife 19. The film continues around the casting roll and then passes to the chill roll 22 which is maintained at 70 degrees F. The film continues around the chill roll, trains through the rolls 24, and enters the machine direction orientation unit (MDO unit) 25. The film is moved at 15 feet per minute past all these rolls.

Within the MDO unit, the film is stretched and stiffened in the machine direction. The film is passed around a first pre-heat roll 26 and then around a second pre-heat roll 28. Both these rolls are maintained at 215 degrees F. and at this point the film continues to move at 15 feet per minute. Although at least a substantial portion of the thickness of the film is heated above its softening temperature so that the hot-stretching operation can be successfully accomplished, the time-temperature relationships are such that the heat-activatable adhesive contained within the adhesive-containing layer is not activated, even though the pre-heat rolls 26 and 28 are at a temperatures above the activation temperature of the heat-activatable adhesive. In the particular example described, that activation temperature must be about 200 degrees F. or less, since it must be low enough so at the time the labels are applied in the blow-mold, good adhesion is attained when the layer 14 is contacted by a parison at 200 degrees F. After leaving the second pre-heat roll 28, the stock tracks on the slow draw roll 31, still moving at 15 feet per minute. The stock then is pulled to the fast draw roll 32 which advances the stock at the rate of 75 feet per minute. Therefore, in the particular example described, the stock is stretched fivefold and is drawn down to about one-fifth its original thickness of 20 mils, or to about 4 mils. Stretch ratios of from 2 to 1 to 8 to 1 may be useful in different circumstances, but a ratio between about 4 to 1 and 6 to one is presently preferred. A midway range extends from about 3 to 1 to about 7 to 1. In the particular example described, the draw rolls 31 and 32 are both maintained at 225 degrees F.

In the particular example described, the stock now continues on its way at the rate of 75 feet per minute. As it leaves the pull-roll pair 31,32, the stretched stock is subject to severe shrinkage if it is heated while under little or no mechanical constraint. The plastic stock is said to have a "memory" of its original length to which it tends to return when heated. The stock is cured or annealed to remove this tendency by applying heat to the tensioned stock at the annealing roll 36 which, in the particular example described, is maintained at 240 degrees F. It is to be noted that since the adhesive side is remote from the roll or "up," it does not directly contact the annealing roll 36 and is therefore not directly subjected to the elevated temperature of that roll. The stock then passes directly to the chill roll 38. The roll 38 is maintained at a temperature of 140 degrees F. and is directly contacted by the adhesive-containing layer of the stock. As the stock passes the rolls 36 and 38, time, temperature and side of contact all play a part in avoiding activation of the heat-activatable adhesive. After leaving the chill roll 38 at the completion of the hot stretch operation, the stock may be taken up as a self-wound roll 39. The roll 39 may be conveniently transported and stored where, as is usually the case, the labels as such are manufactured at a different site than that at which the label stock is manufactured.

Such uniaxial hot-stretching of the stock substantially increases stiffness in the machine direction but leaves the stock relatively flexible in the cross direction. To date, increased stiffness in the machine direction has tended to provide improved labelling manufacture/performance results and no upper limit has been determined. A presently preferred range of stiffness in the machine direction is 40 to 130 Gurley. The cross-direction stiffness tends to be about half or slightly more than half the machine-direction stiffness, say 20 to 65. Particularly good results have been obtained with film materials having a machine direction Gurley in the range of 45 to 120 and a cross direction Gurley in the range of 20 to 60. Gurley stiffness is measured in milligrams using the test method designated as TAPPI T543PM-84.

Uniaxial hot-stretching and annealing are also important to the development of in-mold label film tensile properties necessary to withstand the mechanical and thermal stresses of conventional printing techniques of the type used in processing paper labels. The stretched and annealed film should have a tensile modulus greater than about 65,000 psi and an elongation at break of less than about 950%. Tensile properties including elongation and modulus are measured using the method set forth in ASTM D882.

Preferably, the total thickness of the hot coextrudate is about 20 mils, making a total thickness of about 4 mils following hot-stretching. In a presently preferred construction, the face or top layer 12 and the adhesive-containing or base layer 14 each comprise about 10 percent of the total thickness of the hot-stretched film, so that the central layer comprises about 80 percent of the thickness. Alternately, one or both of the face and base layers may be relatively thicker than the central layer.

In a presently preferred example for white (opaque) labels, the layer compositions by weight percentages are:

EXAMPLE 1

| Top | polypropylene homopolymer | 50 |
|---|---|---|
| | ethylene-vinyl acetate copolymer | 50 |
| Central | polypropylene homopolymer | 70 |
| | ethylene-vinyl acetate copolymer | 15 |
| | titanium dioxide concentrate | 15 |
| Base | heat-activatable adhesive | 25 |
| | antistat | 5 |
| | polypropylene homopolymer | 25 |
| | ethylene-vinyl acetate copolymer | 45 |

The different polymer constituents of the various layers comprise physical blends of the indicated polymers with blending being provided in the pellet feed to the extruder and the extrusion process. The titanium dioxide concentrate is itself a blend of 50% polypropylene homopolymer and 50% titanium dioxide by weight. The concentrate is available in pellet form for convenience of addition to the extrusion feed.

In a presently preferred example for clear labels, the layer compositions by weight percentages are:

EXAMPLE 2

| Top | polypropylene homopolymer | 50 |
|---|---|---|
| | ethylene-vinyl acetate copolymer | 50 |
| Central | random polypropylene copolymer | 60 |
| | ethylene-vinyl acetate copolymer | 40 |
| Base | heat-activatable adhesive | 25 |
| | polypropylene homopolymer | 25 |
| | ethylene-vinyl acetate copolymer | 45 |
| | antistat | 5 |

The random polypropylene copolymer of the central layer or core contains about 3 to 5% polyethylene by weight. The white label stock is slightly stiffer than the clear label stock. This is believed to be due to the stiffening effect of the titanium dioxide. The stiffness of the clear label stock may be increased by increasing the proportion of the polypropylene copolymer. In the following Example 3, the core layer is modified to attain a stiffness similar to that of Example 1.

EXAMPLE 3

| | | |
|---|---|---|
| Top | polypropylene homopolymer | 50 |
| | ethylene-vinyl acetate copolymer | 50 |
| Central | polypropylene homopolymer | 85 |
| | ethylene-vinyl acetate copolymer | 15 |
| Base | heat-activatable adhesive | 25 |
| | polypropylene homopolymer | 25 |
| | ethylene-vinyl acetate copolymer | 45 |
| | antistat | 5 |

EXAMPLE 4

Example 4 is prepared by extrusion of the composition of Example 3 with a thickness of about 22.5 mils to result in a total film thickness of about 4.5 mils after hot-stretching. The ratio of the relative thicknesses of the layers of the film of Example 4 is similar to that of Examples 1–3.

The heat-activatable adhesive is a proprietary product sold by H. B. Fuller of Blue Ash, Ohio under product number HM727, and comprises ethylene-vinyl acetate copolymer ("EVA"), polyethylene waxes and a tackifier effective to accomplish adhesion to HDPE. The adhesive is itself far too "watery" or low in viscosity to be successfully extruded, but blends well with the EVA. The EVA stiffens up the extrudate, but is too sticky to process following extrusion, because it tends to stick to processing rolls with which it comes into contact while it is warm so as to damage the adhesive layer or laminate. The addition of polypropylene gives the extrudate excellent heat stability for hot-stretching and other processing. The addition of polypropylene also controls and moderates tackiness so as to make it possible and practical to process the extrudate film according to the concept of controlling time-temperature-direction conditions so as to avoid sticking to the rolls even though activation temperature of the adhesive is below glass transition and annealing temperatures. At the same time, the reduction of tackiness effected by the polypropylene does not interfere with excellent adhesion of the film to a plastic container of HDPE, for example. The proportions of EVA and polypropylene may be varied to accommodate processing variations.

The antistat is incorporated in the adhesive-containing or base layer charge and uniformly blended therewith. The amount of antistat used may be varied for particular formulations and processing conditions, the 5% amount used herein being typical. The antistat is efficiently used since it may be added to the adhesive or base layer charge only. Thus, the antistat addition to the base layer charge only provides specificity and efficiency of use without the disadvantages of a topically applied antistat. In certain applications, it may be advantageous to also include the antistat in the central layer charge as well as the base layer charge, or in the central layer charge only.

In the particular examples described, the antistat used is sold by Hoechst Celanese under product number E1956 and is of the type that when added in bulk blooms to the surface and dissipates electric charges by hydrophilic action which attracts extremely minute amounts of ambient moisture. BY adding the antistat to the adhesive layer only, collection of moisture at the face layer which may interfere with the label printing process is avoided. Most surprising, it has been found that moisture collected at the adhesive layer surface does not interfere with adhesion of the label to the container in the in-mold labelling process. It is believed that the moisture is vaporized or dissipated by the elevated molding service temperatures, but in such small quantities as to not interfere with adhesion.

It is to be noted that the compositions in the two outer layers are similar, the components being in large measure identical. The result is that the construction is well balanced with respect to heat-shrinkability at both sides of the construction. Such balancing of heat-shrinkability is an important concept of the invention.

As described above, the presently preferred top and base layer formulations comprise blends of olefin polymers and copolymers of olefin monomers with ethylenically unsaturated carboxylic acid or ethylenically unsaturated carboxylic acid ester comonomers such as the ethylene-vinyl acetate copolymer. The presently preferred central or core layer formulations also comprise blends of olefin polymers and copolymers of olefin monomers with ethylenically unsaturated carboxylic acid or ethylenically unsaturated carboxylic acid ester comonomers such as the ethylene-vinyl acetate copolymer.

The composition of the film layers should preferably be compatible with the container composition to enable recycle and regrindability of waste or the like during production. Also, compatible label and container compositions enable post-consumer-use recycling of the container and integral label.

As schematically illustrated in FIG. 3, the hot-stretched stock, which may be supplied in the form of the self-wound roll 39, may be printed or decorated in a printing press 40 in which the stock is subjected to mechanical and thermal stress incident to the printing itself and to the drying of the ink by exposure to heat as such or by exposure to ultraviolet radiation which tends to also generate infrared radiation.

Following printing and drying, the stock may be sheeted and stacked in a manner similar to that known for the sheeting of paper-backed label stock. Cutting is indicated by arrow G in the drawings. The severed sheets are stacked to form the stack 44. The stack may contain 100 or 200 sheets. For clarity of illustration, in the drawing the thickness of the sheets is greatly exaggerated and the stack 44 is therefore shown as made up of only a relatively small number of sheets. Each sheet in the stack is intended to provide material for several individual labels to be die-cut from the sheeted material. In the particular example described, nine labels are die-cut from each sheet. The sheets in the stack must be very accurately registered with each other so that the labels to be cut from the sheet will be formed in correct registration to the printing that appears on their face according to the pattern printed by the press 40.

If the linerless unsupported label stock is too limp, accurate stacking is prevented due to the inability to guidingly control positioning of a limp sheet by means of belts, guideways, stops or similar guiding means (not shown) with any degree of accuracy. The stiffening of the linerless stock by uniaxial hot-stretching to desired stiffnesses, as discussed more fully below, allows accurate stacking to be achieved.

Accurate stacking and subsequent handling of the sheets or labels formed therefrom is also impeded if static charges are present on the sheets or labels. The antistat present in the base layer acts to remove static charges. In the antistat used in the above examples, this action involves the creation of a very thin layer of moisture at the surface of the base layer. Even though this moisture-containing surface contacts the surface of the hot workpiece as the workpiece is formed, as more fully described below, molding of the workpiece and performance of the adhesive is not adversely affected to any detected degree by flashing of the moisture.

Individual labels are formed in a known manner by hollow punches or cutting dies 46 carried on a head 48, seen in bottom plan view in FIG. 4 and in side elevation in FIGS. 5 and 6. The cutting dies punch out the labels from the stack 44, producing in each cutting cycle a number of stacks 50 of individual labels. In the particular example described, nine stacks of individual labels are produced in each cutting cycle.

The stacks 50 of individual labels are stabilized by suitable wrapping or packaging (not shown) in a manner similar to that previously used with paper-backed labels. The stabilized stacks 50 are then moved or transported to the site where the blow-molded containers are being manufactured, which often is a at a different place than the site of label manufacture.

At the site of container manufacture, stacks 50 of individual labels are loaded in a dispensing magazine of a known type, schematically illustrated by magazine 54 in FIG. 8. For example, the labels may be advanced to the front of the magazine by spring means 56, and may be lightly retained for pick-off by springy or mechanically retracting retainer fingers 58. A robotic label feed head 60 carries vacuum cups 62 adapted to be advanced by means (not shown) internal to the head 60 to pick off the front label in the stack 50, retracted for translating movement of the head and the single picked-off label 50a into the opened blow mold 64 by actuation of the translating cylinder 61, and advanced again to apply the picked-off label to the interior surface of the mold and release it. The label may then be held accurately in position within the mold by vacuum applied to the mold wall through vacuum lines 66 while the label feed head 60 is retracted. The vacuum line outlets to the interior of the mold may be flush with the interior surface of the mold, as shown, so that the label occupies part of the mold cavity proper. In other words, preferably there is no recess on the interior mold surface to accommodate the label.

A hot workpiece or parison (not shown) of polyethylene or similar thermoplastic resin is fed into the mold, the mold is closed, and the parison is expanded in a known manner to complete the formation of the molded container. As the hot parison contacts the adhesive-containing base layer 14 of the label, activation of the adhesive is triggered. As indicated above, the annealing temperature of the in-mold label film should exceed the service temperature in the mold in order to avoid label shrinkage or distortion. To assure a uniform joining of the label and container, it is also desirable that the softening temperature of the in-mold label film be close to the service temperature. If, as is preferred, the label is on, not in, the interior surface of the mold, the label becomes embedded in the workpiece to which it is adhered, thus advantageously providing an inset label that is flush with the container surface and that replaces and therefore saves a portion of the charge for the molded workpiece or container without diminishing the structural integrity of the workpiece to any detected degree. As previously indicated, even though the antistat in the base layer causes the presence of moisture at the face of the base layer which must flash off upon contact of the base layer by the surface of the hot parison, the temperature of which may be say about 200 degrees F., no detected adverse affect on adhesion or molding occurs.

Other mechanisms may be employed involving rotary movement of the robotic parts. Generally, regardless of whether rotary movement is involved, the elements of such label feed mechanisms move at high speed. If the labels are too limp, they tend to flutter, interfering with proper positioning. Also, pick-off becomes unreliable because more than one label at a time may be picked off since limp labels tend to follow each other past the retainer fingers 58. The self-supporting or linerless labels must retain their dimensional and positional integrity without the benefit of a reinforcing backing.

Experience to date indicates that a minimum stiffness of about 40 Gurley in the machine direction is sufficient to accomplish this purpose and also to allow accurate sheet registration in the forming of the stack 49 at the earlier stage of manufacture illustrated in FIG. 3.

In accordance with the foregoing processing conditions, the compositions of Examples 1, 2, 3 and 4 were coextruded, hot-stretched and annealed to provide in-mold label films. The properties of the films are reported below in Table I.

TABLE I

| EXAMPLE NUMBER | | 1 | 2 | 3 | 4 |
|---|---|---|---|---|---|
| Thickness (mils) | | 4.0 | 4.0 | 4.0 | 4.5 |
| Opacity (%) | | 85.0 | 10.5 | 10.5 | 10.5 |
| Gurley Stiff. | MD | 80 | 45 | 80 | 115 |
| (mg) | CD | 35 | 20 | 35 | 50 |
| Ten. Mod. | MD | 285 | 145 | 270 | 270 |
| (1000 psi) | CD | 100 | 45 | 90 | 90 |
| Elong. (%) | MD | 45 | 55 | 45 | 45 |
| | CD | 275 | 800 | 500 | 500 |
| Ten. Str. | MD | 25.0 | 18.0 | 27.0 | 27.0 |
| (1000 psi) | CD | 2.5 | 2.2 | 3.3 | 3.3 |

Films having a composition in accordance with Example 3 have been used for in-mold labelling of high density polyethylene containers. As described below, the printing and label converting processes are performed using conventional paper label apparatus and techniques.

The labels were printed using typical paper label printing presses, such as a Gallus press, and UV curing inks. The films were pulled through the press with a minimum force of about 20 pounds on a 6.5 inch wide web so as to impose a loading of about 3 pounds per linear inch. Even though UV curing inks are used, the ultraviolet radiation source generates heat and the temperatures in the cure portion of the press may range from ambient (e.g. about 70 degrees F.) up to about 140 to 150 degrees F. The film of Example 3 was printed using printing conditions similar to those used for paper labels. The film displayed sufficient dimensional stability to enable maintenance of printing registration and did not excessively stretch or elongate so as to otherwise prevent processing.

The printed labels were sheeted using conventional techniques as described above. The antistat in the adhesive or base layer of the film of Example 3 effectively reduced and/or eliminated static charge problems in the handling and stacking of the cut film and labels.

The labels of Example 3 were applied to containers using both shuttle and rotary blow-molding machines operating at typical production rates. More particularly, labels were applied using a Beckum BETM shuttle two-cavity blow-molding machine operating at a rate of about 30 containers per minute and a Graham Engineering rotary blow-molding machine operating at rate of about 60 containers per minute. In these applications, a low melt flow, high density polyethylene resin, such as that sold by Quantum Chemical under designation number 5602, was molded at a parison temperature of 390 degrees F. as measured at the barrel exit. The robotic arms automatically disposed the labels in the mold without multiple label feed and/or label folding problems. The labels adhered to the bottles along a substantially bubble free adhesion interface. Upon squeezing or deforming of the labelled bottle, the label adhered and conformed to the bottle without forming unacceptable fold or crease lines.

The following comparative examples illustrate the effects of various physical properties of the subject films in the label manufacture and application processes. In each of the following comparative examples, the compositions were formed into three layer films of the indicated total thickness and a 10/80/10 relative layer thickness ratio using the above described coextrusion, hot-stretching and annealing techniques to provide in-mold label films.

COMPARATIVE EXAMPLE 1

| Top | polypropylene homopolymer | 50 |
| | ethylene-vinyl acetate copolymer | 50 |
| Central | polypropylene homopolymer | 30 |
| | high density polyethylene | 33 |
| | ethylene-vinyl acetate copolymer | 15 |
| | talc | 15 |
| | titanium dioxide | 7 |
| Base | polypropylene homopolymer | 50 |
| | ethylene-vinyl acetate copolymer | 50 |

A 3.5 mil thick in-mold label film of the composition of Comparative Example 1 had a machine direction Gurley stiffness value in the range of from about 40 to about 48. Due to the relatively low Gurley stiffness values and the absence of an antistat component, the handling characteristics of this film were not entirely satisfactory during sheeting and the cut film did not uniformly stack since the relatively limp cut film pieces did not easily slide over each other and such movement was impeded by any static charges present. For similar reasons, labels formed from this film and used in a Graham Engineering rotary blow-molding machine in the above described manner did not dispense satisfactorily in that the label tended to fold and/or flap as it was placed in the mold. Further, the base layer failed to stick to a high density polyethylene container.

Comparative Example 2 was the same as Comparative Example 1 except that it had a total film thickness of 4 mils and the base layer composition was as follows; polypropylene homopolymer (50), ethylene-vinyl acetate copolymer (25), and heat activatable adhesive (25). The film of Comparative Example 2 had a Gurley value of about 60, and it satisfactorily sheeted and dispensed when processed in a manner similar to Comparative Example 1. However, there was a lack of adhesion sufficient to affect label and container conformability. The adhesion deficiencies are indicated by bubbles along the adhesion interface between the container and adjacent label base surface.

Comparative Example 3 included modification of the base layer formulation to that of Examples 1-3 herein and achievement of satisfactory adhesion and static charge properties. This film had a machine direction Gurley stiffness value of about 60. The film displayed satisfactory film processing characteristics and resulted in labels having acceptable adhesion and conformability properties when applied to high density polyethylene containers. However, surface mottling possibly due to water absorption by the talc was observed.

Comparative Example 4 comprised a modification of the formulation of Comparative Example 3 wherein polypropylene homopolymer was substituted for the talc component. Surprisingly, an additional increase in Gurley from about 60 to about 80 was attained. This additional stiffness is believed beneficial.

As shown in Table I, uniaxial stretching provides the films of Examples 1-4 with dimensional stability to enable linerless processing thereof. More particularly, the uniaxial stretching techniques of the invention tend to stabilize the film and facilitate linerless film processing as, for example, label printing using conventional printing presses as illustrated above. The relatively low elongation values at break and the high tensile modulus values in the machine direction are believed to characterize acceptable dimensional stability of the film correlating to the stretching techniques of the invention.

Referring to Table II below, Comparative Examples 5 and 6 comprise commercially available in-mold label film. These films are believed to comprise multilayer coextruded polyolefin constructions of primarily medium density polyethylene.

TABLE II

| Comparative Example Number | | 5 | 6 |
| --- | --- | --- | --- |
| Thickness (mils) | | 4.5 | 4.5 |
| Opacity (%) | | 12.5 | 78.0 |
| Gurley Stiffness | MD | 45 | 55 |
| (mg) | CD | 55 | 60 |
| Tensile Modulus | MD | 65 | 65 |
| (1000 psi) | CD | 70 | 75 |
| Elongation (%) | MD | 950 | 850 |
| | CD | 1150 | 1050 |
| Tensile Strength | MD | 3.2 | 2.6 |
| (1000 psi) | CD | 2.9 | 2.7 |

As indicated by the stiffness, tensile and elongation properties, it is not believed that the films of Comparative Examples 5 and 6 are hot-stretched as in the present invention. However, the films of Comparative Examples 5 and 6 may be imparted with a limited degree of melt orientation during the coextrusion process. The limited orientation, if any, of these films results in relatively low tensile modulus and elongation properties in the machine direction which are believed to be associated with the printing problems encountered with such films. More particularly, films in accordance with Comparative Examples 5 and 6 tend to elongate excessively during printing upon application of press tension and temperature conditions described above so as to prevent or substantially inhibit maintenance of print registration and film handling by conventional printing techniques. Thus, it is believed that linerless film processing of in-mold film using conventional printing techniques requires a machine direction tensile modulus greater about 65,000 psi and/or an elongation at break less than about 850%.

While the invention has been illustrated and described with respect to sheeting of the label stock, it is to be understood that in important aspects the invention may also be advantageous if it becomes feasible to form and handle the in-mold labels in other ways, such as using rotary dies and feed belts and the like.

It should be evident that this disclosure is by Way of example, and that various changes may be made by adding, modifying or eliminating details without departing from the fair scope of the teaching contained in this disclosure. The invention therefore is not limited to particular details of this disclosure except to the extent that the following claims are necessarily so limited.

What is claimed is:

1. An in-mold labelling method comprising the steps of coextruding a plurality of at least two charges of film-forming resin, coextruding said charges to thereby form a construction in the form of a multilayer extrudate having a face side and a back side, preselecting said charges to provide a printable face on said face side and a heat-activated adhesive at said back side, uniaxially hot-stretching and annealing said extrudate using hot stretching and annealing means to thereby enhance the dimensional stability of the free-film extrudate, printing the face side of the free-film extrudate and exposing the extrudate to a drying agent to dry the ink, die-cutting the free-film extrudate to form individual labels, and sequentially deploying the labels on a molding surface of a blow mold for bonding onto successive hot workpieces as said workpieces are blown and expanded against said molding surface and against said label whereby contact by said hot workpieces activates said adhesive wherein said extrudate has an annealing temperature above the temperature at which said hot workpieces contact said adhesive to activate it, said step of annealing further including heating at least a majority of the thickness of the extrudate to above the annealing temperature without activating the adhesive to an extent which results in sticking of the adhesive to the annealing means despite said annealing temperature being above the temperature at which said workpieces contact said adhesive to activate it.

2. A method as in claim 1, said step of hot-stretching and annealing including training said extrudate through a series of relatively hot and cool rolls which contact said extrudate to thereby impart heat to and remove heat from said extrudate under time-temperature-direction conditions established by line speed, roll temperature, roll size, and side of contact, said step of hot-stretching and annealing further including controlling said time-temperature-direction conditions to heat at least a majority of the thickness of the extrudate to above its annealing temperature following stretching.

3. A method as in claim 2, said step of hot-stretching and annealing including contacting the face side of said extrudate with annealing roll means heated to a temperature above the temperature of activation of the adhesive so as to impart heat from said annealing roll means to the construction without flowing said heat through said adhesive.

4. A method as in claim 1, said extrudate having a softening temperature above the temperature at which said hot workpieces contact said adhesive to activate it, said step of hot-stretching and annealing including training said extrudate through a series of relatively hot and cool rolls which contact said extrudate to thereby impart heat to and remove heat from said extrudate under time-temperature-direction conditions established by line speed, roll temperature, roll size, and side of contact, said step of hot-stretching and annealing further including controlling said time-temperature-direction conditions to heat at least a majority of the thickness of the extrudate to above its softening temperature prior to stretching without sticking of said adhesive to any of said series of rolls, and heating at least a majority of the thickness of the extrudate to above its annealing temperature following stretching without sticking of said adhesive to any of said series of rolls, despite both said softening temperature and said annealing temperature being above the temperature at which said hot workpieces contact said adhesive to activate it.

5. A method as in claim 4, said step of hot-stretching and annealing including contacting the face side of said extrudate with annealing roll means heated to a temperature above the temperature of activation of the adhesive so as to impart heat from said annealing roll means to the construction without flowing said heat through said adhesive.

6. A method as in claim 1, said preselecting step including preselecting said charges to contain major proportions of like materials to thereby balance the heat-shrinkability at each side of said extrudate to a sufficient extent to limit curling of the extrudate following hot-stretching.

7. A method as in claim 1, said preselecting step including providing an antistat agent in the charge for the layer which includes the heat-activatable adhesive.

8. A method as in claim 6, said preselecting step including providing an antistat agent in the charge for the layer which includes the heat-activatable adhesive.

9. A method as in claim 1, including uniaxially hot-stretching said extrudate at a stretch ratio in the range of from about 2 to 1 to about 8 to 1.

10. A method as in claim 1, including uniaxially hot-stretching said extrudate at a stretch ratio in the range of from about 4 to 1 to about 6 to 1.

11. A method as in claim 1, including between the steps of hot-stretching and printing, self-rolling said extrudate, transporting said self-rolled extrudate, and unrolling said self-rolled extrudate.

12. A method as in claim 1, wherein said stretched and annealed free-film extrudate has a machine direction Gurley stiffness value greater than about 40.

13. A method as in claim 1, wherein said stretched and annealed free-film extrudate has a machine direction Gurley stiffness value in the range of from about 40 to about 130 and a cross direction Gurley stiffness value in the range of from about 20 to about 65.

14. A method as in claim 1, wherein said stretched and annealed free-film extrudate has a tensile modulus value greater than about 65,000 psi.

15. A method as in claim 14, wherein said stretched and annealed free-film extrudate has a machine direction Gurley stiffness value greater than about 45.

16. A method as in claim 15, wherein said stretched and annealed free-film extrudate has a machine direction elongation at break less than about 850%.

17. A method as in claim 16, wherein said stretched and annealed free-film extrudate has a sufficiently high tensile modulus and stiffness value in the machine direction to enable it to withstand the mechanical and thermal stresses of conventional printing processes including film tension loads of about three pounds per linear inch of film width at temperatures ranging from about 70 degrees F. to about 150 degrees F.

18. A method as in claim 1, wherein said stretched and annealed free-film extrudate has a machine direction elongation at break less than about 850%.

19. A method as in claim 1, in which said stretched and annealed free-film extrudate has a machine direction Gurley stiffness value greater than its cross direction Gurley stiffness value and a machine direction elongation at break less than about 850%.

20. An in-mold labelling method comprising the steps of coextruding a plurality of at least three charges of film-forming resin, coextruding said charges to thereby form a construction in the form of a multilayer extrudate having a face layer, a back layer, and a core layer, preselecting said charges to provide a printable face at the face of said face layer and a heat activated adhesive at said back layer, uniaxially hot-stretching and annealing said extrudate using hot stretching and annealing means to thereby enhance the dimensional stability of the free-film extrudate, printing said face of the face layer, die-cutting the free-film extrudate to form individual labels, and sequentially deploying the labels on a molding surface of a blow mold for bonding onto successive hot workpieces as said workpieces are blown and expanded against said molding surface and against said label whereby contact by said hot workpieces activates said adhesive wherein said extrudate has an annealing temperature above the temperature at which said hot workpieces contact said adhesive to active it, said step of annealing further including heating at least a majority of the thickness of the extrudate to above the annealing temperature without activating the adhesive to an extent which results in sticking of the adhesive to the annealing means despite said annealing temperature being above the temperature at which said workpieces contact said adhesive to activate it.

21. A method as in claim 20, said step of hot-stretching and annealing including training said extrudate through a series of relatively hot and cool rolls which contact said extrudate to thereby impart heat to and remove heat from said extrudate under time-temperature-direction conditions established by line speed, roll temperature, roll size, and side of contact, said step of hot-stretching and annealing further including controlling said time-temperature-direction conditions to heat at least a majority of the thickness of the extrudate to above its annealing temperature following stretching.

22. A method as in claim 21, said step of hot-stretching and annealing including contacting the face side of said extrudate with annealing roll means heated to a temperature above the temperature of activation of the adhesive so as to impart heat from said annealing roll means to the construction without flowing said heat through said adhesive.

23. A method as in claim 20, said extrudate having a softening temperature above the temperature at which said hot workpieces contact said adhesive to activate it, said step of hot-stretching and annealing including training said extrudate through a series of relatively hot and cool rolls which contact said extrudate to thereby impart heat to and remove heat from said extrudate under time-temperature-direction conditions established by line speed, roll temperature, roll size, and side of contact, said step of hot-stretching and annealing further including controlling said time-temperature-direction conditions to heat at least a majority of the thickness of the extrudate to above its softening temperature prior to stretching without sticking of said adhesive to any of said series of rolls, and heating at least a majority of the thickness of the extrudate to above its annealing temperature following stretching without sticking of said adhesive to any of said series of rolls, despite both said softening temperature and said annealing temperature being above the temperature at which said hot workpieces contact said adhesive to activate it.

24. A method as in claim 23, said step of hot-stretching and annealing including contacting the face side of said extrudate with annealing roll means heated to a temperature above the temperature of activation of the adhesive so as to impart heat from said annealing roll means to the construction without flowing said heat through said adhesive.

25. A method as in claim 20, said preselecting step including preselecting said charges to contain major proportions of like materials to thereby balance the heat-shrinkability at each side of said extrudate to a sufficient extent to limit curling of the extrudate following hot-stretching.

26. A method as in claim 20, said preselecting step including providing an antistat agent in the charge for the layer which includes the heat-activatable adhesive.

27. A method as in claim 25, said preselecting step including providing an antistat agent in the charge for the layer which includes the heat-activatable adhesive.

28. A method as in claim 20, including uniaxially hot-stretching said extrudate at a stretch ratio in the range of from about 2 to 1 to about 8 to 1.

29. A method as in claim 20, including uniaxially hot-stretching said extrudate at a stretch ratio in the range of from about 4 to 1 to about 6 to 1.

30. A method as in claim 20, including between the steps of hot-stretching and printing, self-rolling said extrudate, transporting said self-rolled extrudate, and unrolling said self-rolled extrudate.

* * * * *